(12) United States Patent
Rodgers

(10) Patent No.: US 10,452,695 B2
(45) Date of Patent: Oct. 22, 2019

(54) CONTEXT-BASED VIRTUAL ASSISTANT IMPLEMENTATION

(71) Applicant: Oracle International Corporation, Redwood Shores, CA (US)

(72) Inventor: Michael Patrick Rodgers, Rochester, MN (US)

(73) Assignee: Oracle International Corporation, Redwood Shores, CA (US)

( * ) Notice: Subject to any disclaimer, the term of this patent is extended or adjusted under 35 U.S.C. 154(b) by 113 days.

(21) Appl. No.: 15/712,480

(22) Filed: Sep. 22, 2017

(65) Prior Publication Data

US 2019/0095524 A1 Mar. 28, 2019

(51) Int. Cl.
*G06F 16/332* (2019.01)
*G10L 15/22* (2006.01)
*G06F 16/33* (2019.01)
*G06F 16/2457* (2019.01)

(52) U.S. Cl.
CPC .... *G06F 16/3329* (2019.01); *G06F 16/24575* (2019.01); *G06F 16/334* (2019.01); *G10L 15/22* (2013.01)

(58) Field of Classification Search
CPC .................................................. G06F 16/3329
USPC .............................................................. 704/9
See application file for complete search history.

(56) References Cited

U.S. PATENT DOCUMENTS

| | | | |
|---|---|---|---|
| 6,275,789 B1 * | 8/2001 | Moser | G06F 17/271 704/2 |
| 6,829,603 B1 * | 12/2004 | Chai | G06F 16/3344 |
| 9,973,269 B2 * | 5/2018 | Sarkar | H04B 7/24 |
| 10,075,828 B2 * | 9/2018 | Horton | G05B 15/02 |

* cited by examiner

*Primary Examiner* — Susan I McFadden
(74) *Attorney, Agent, or Firm* — Invoke

(57) ABSTRACT

Techniques for maintaining a dialog between a virtual assistant and a user are presented. The system generates a context object. Contextual information, related to the dialog, is stored to the context object. The contextual information, may define a state. Based on the state, the virtual assistant may present information, present a query, execute a query, or receive information from a user. The virtual assistant determines context throughout the conversation via the context object. The virtual assistant may to determine a variable corresponding to received input using information stored to the context object.

19 Claims, 5 Drawing Sheets

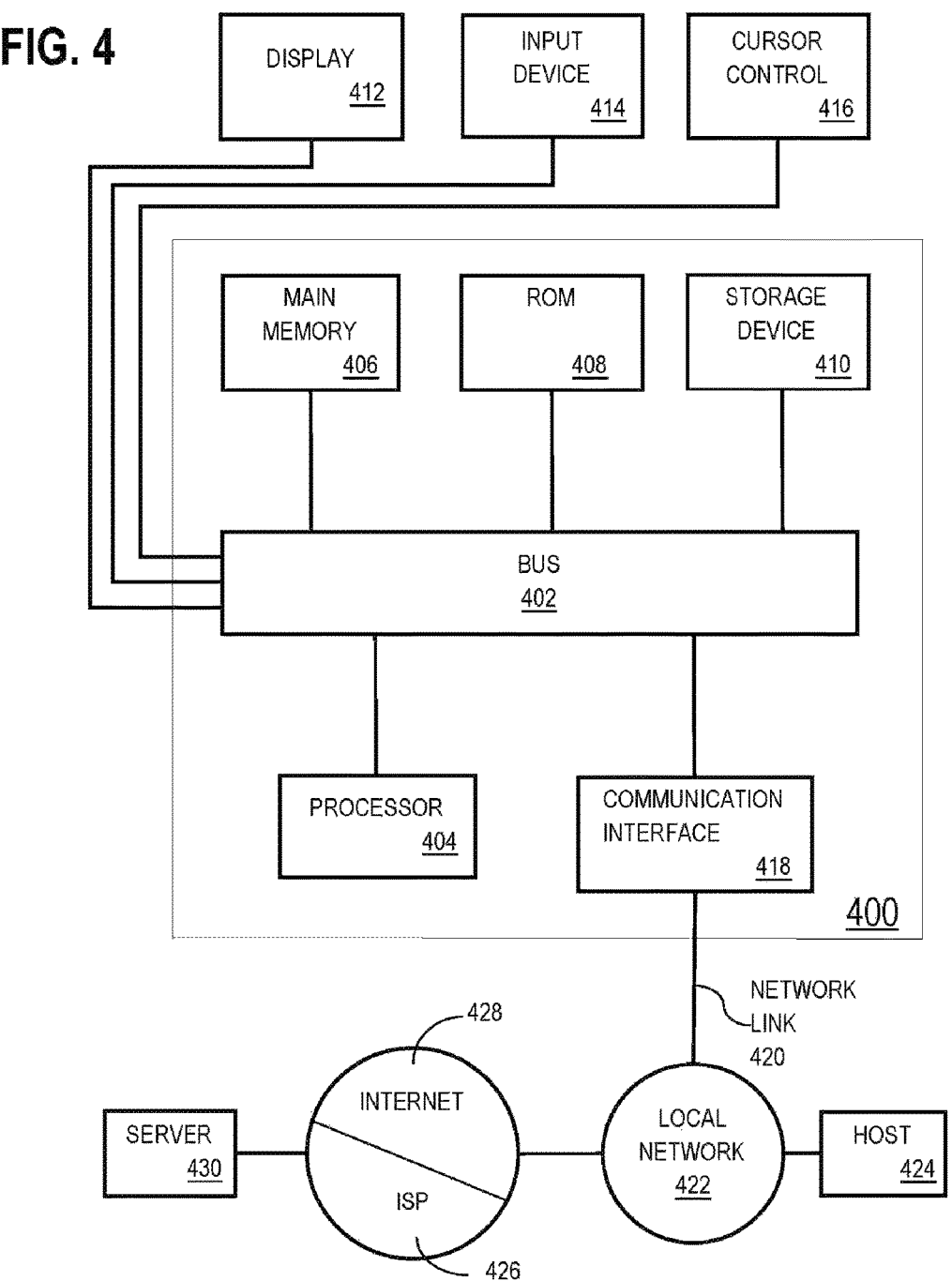

CONTEXT-BASED VIRTUAL ASSISTANT IMPLEMENTATION

TECHNICAL FIELD

The present disclosure relates to virtual assistants. In particular, the present disclosure relates to maintaining a dialogue between a virtual assistant and a user via a state-specific context object.

BACKGROUND

A virtual assistant is a software agent used to perform tasks. A virtual assistant may accept an instruction from a user via voice commands and/or text commands. Voice commands may be received by a smart speaker. Alternatively, a virtual assistant may receive commands from a user via text commands typed into a chat interface. Generally, a virtual assistant executes a simple task responsive to a request. For example, responsive to the voice command "What is the weather like today?" a virtual assistant obtains, and reads, today's weather forecast.

The virtual assistant may use a particular application or module for executing a specific task. As examples, virtual assistants invoke stand-alone applications to find directions, check the weather, and update a calendar. A virtual assistant may determine the user's intent to identify a task to execute. The virtual assistant may determine the intent using sample utterances. As an example, an application called lookupBalance is invoked based the sample utterance, "What is the balance of my checking account?".

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONTEXT-BASED VIRTUAL ASSISTANT SYSTEM
3. CONTEXT-BASED VIRTUAL ASSISTANT DIALOGUE
4. GENERATING A VIRTUAL ASSISTANT APPLICATION
5. EXAMPLE EMBODIMENT
6. MISCELLANEOUS; EXTENSIONS
7. HARDWARE OVERVIEW

1. GENERAL OVERVIEW

One or more embodiments include maintaining a dialogue between a virtual assistant and a user via a state-based context object. The system establishes states, corresponding to respective portions of the dialogue. The system stores, to the context object, contextual information. The contextual information may include the current state and information associated with the state. Based on the current state, the virtual assistant requests information from a user. The system may receive input from a user via a smart speaker or chat interface. The system maps a portion of the received input to a variable, corresponding to the information requested. The system may map the input to the variable based on the current state, the previous state, and/or user input history. The system may update the context object to a new state as the dialogue progresses.

One or more embodiments include customizing a virtual assistant application via a graphical interface. The system presents nodes and connectors, via the graphical interface. The system allows a user to configure the nodes and connectors to make a state diagram, wherein each node represents a respective state. The system enables the user to rearrange the nodes to configure the order of states. The system enables the user to select input and/or output associated with a state node. The system converts the state diagram to executable code for a virtual assistant application.

One or more embodiments described in this Specification and/or recited in the claims may not be included in this General Overview section.

2. CONTEXT-BASED VIRTUAL ASSISTANT SYSTEM

Figure 1:
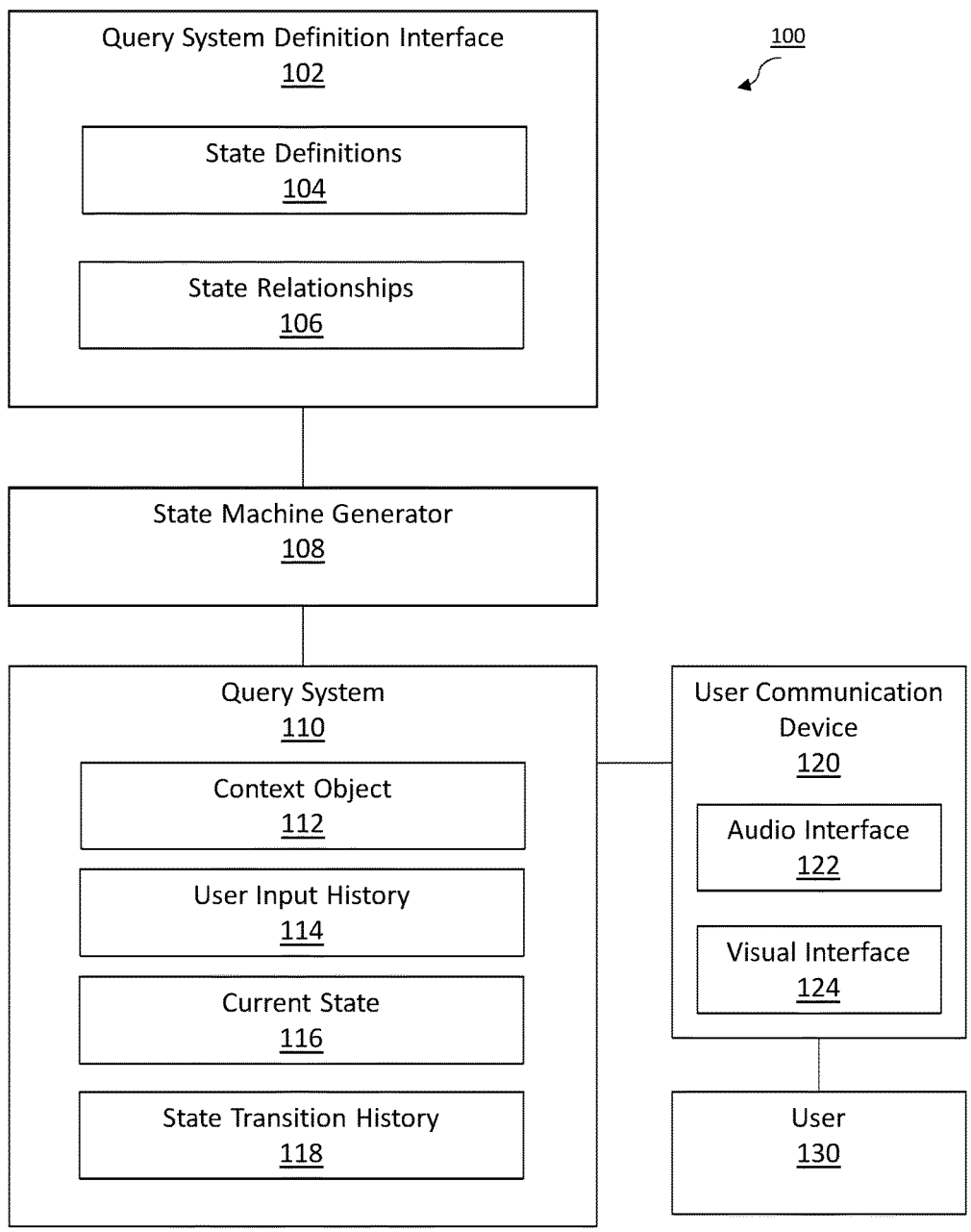
FIG. 1 illustrates a system in accordance with one or more embodiments.

FIG. 1 illustrates a system 100 in accordance with one or more embodiments. As illustrated in FIG. 1, system 100 includes a query system definition interface 102, state machine generator 108, query system 110, and user communication device 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the system 100 executes a task, based on input from a user 130. Example tasks include making a travel arrangement, giving directions, displaying a requested image, and transferring funds between accounts.

One or more steps in a task may be executed based on a dialogue with the user 130. A dialogue may comprise inputs received by the user 130 and outputs generated by the system 100. The dialogue may include an initial request from the user 130. The dialogue may include a response, from the system 100, that resolves the user request. The dialogue may include a request, generated by system 100, for additional information from the user 130.

In one or more embodiments, the user communication device 120 includes hardware and/or software configured to facilitate communication with the user 130. The user communication device 120 may receive information from the user 130. The user communication device 120 may transmit information to the user 130. The user communication device may facilitate communication with the user 130 via an audio interface 122 and/or a visual interface 124. The user communication device 120 is communicatively coupled to query system 110.

In an embodiment, the user communication device 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, the user communication device 120 is a smart speaker. The smart speaker receives audio data from user 130. The smart speaker plays audio. The smart speaker transmits information to and from query system 110. The smart speaker may be implemented as a stand-alone device, or as part of a smart device such as a smartphone, tablet, or computer.

In one or more embodiments, audio interface 122 refers to hardware and/or software configured to facilitate audio communication between user 130 and the user communication device 120. The audio interface 122 may include a speaker to play audio. The played audio may include verbal questions and answers comprising a dialogue. The audio interface may include a microphone to receive audio. The received audio may include requests and other information received from the user 130.

In one or more embodiments, visual interface 124 refers to hardware and/or software configured to facilitate visual communications between a user and the user communication device 120. The visual interface 124 renders user interface elements and receives input via user interface elements. Examples of visual interfaces include a graphical user interface (GUI) and a command line interface (CLI). Examples of user interface elements include checkboxes, radio buttons, dropdown lists, list boxes, buttons, toggles, text fields, date and time selectors, command lines, sliders, pages, and forms.

The visual interface 124 may present a messaging interface. The messaging interface may be used to accept typed input from a user. The messaging interface may be used to display text to the user. The visual interface 124 may include functionality to display images, such as maps and pictures.

The visual interface 124 may include functionality to upload an image. As an example, the user 130 uploads a picture of an animal, along with the text, "What is this?".

In an embodiment, the query system 110 is a system for executing one or more tasks, responsive to input from the user 130 via user communication device 120. The query system 110 may receive voice input, text input, and/or images, from the user communication device 120.

The query system 110 may convert voice input to text using speech recognition techniques. The query system 110 may digitize and/or filter received voice input. The query system 110 may compare the voice input to stored template sound samples to identify words or phrases. The query system 110 may separate the voice input into components for comparison with sounds used in a particular language.

The query system 110 may use natural language processing to identify one or more executable commands, based on the text. The query system 110 may isolate relevant text from a block of text. The query system 110 may identify keywords in a block of text. The query system 110 may compare received text to template language associated with a task executable by the query system 110.

The query system 110 may implement artificial intelligence techniques, such as machine-learning, to improve over time. The query system may store past dialogues for comparison with a current dialogue. As an example, in a past dialogue, the query system 110 presented 5 follow-up questions to complete a particular task. Based on learning from the past dialogue, the query system 110 only presented 1 follow-up question, in the current dialogue, to complete the same task.

In an embodiment, the query system 110 is implemented remotely from the user communication device 120. The query system 110 may execute on a cloud network. Alternatively, the query system 110 may execute locally to the user communication device 120. The query system 110 may execute tasks or retrieve information from one or more external servers. As an example, the query system 110 may retrieve traffic data from a third-party map application.

In an embodiment, the query system 110 retrieves data from the user communication device 120. As an example, the query system may query the user communication device 120 to determine a location via a Global Positioning System (GPS) functionality of the user communication device 120. As another example, the query system 110 may query the user communication device 120 to determine if the user is free at a particular time, by accessing data associated with a calendar application stored to the user communication device 120.

The query system may determine operations to execute, based on a context. The query system 110 may determine the context based on analyzing user input. The query system 110 may determine the context based on user input history 114. The query system 110 may determine a context based on a state.

In an embodiment, the context object 112 is an object that stores contextual information about a dialogue. The context object 112 may be transmitted back and forth between user communication device 120 and query system 110, over the course of a dialogue. The context object may store information to reflect the last operation executed by the query system 110. The context object may store information to reflect user input history 114. The context object 112 may store information to reflect a current state 116 and/or state transition history 118.

In an embodiment, the user input history 114 is a record of user input over the course of one or more dialogues. User input history 114 may include information about the sequence of a series of voice inputs. User input history 114 may categorize user input by type. For example, the user makes a weather-related request every morning at 8 am.

In an embodiment, the context object 112 stores state information. Each state may be assigned a respective state identification number. The query system may use the state information to determine one or more operations to execute in association with a particular state. As an example, in state 1, the user communication device plays the audio, "Hello," and accepts a user response. In state 2, the user communication device plays the audio, "How are you today?".

In an embodiment, the context object 112 stores information about a current state 116. The current state is the state associated with the context object 112 at a particular time. The current state 116 may be associated with a unique state identifier. The current state 116 may be denoted by, for example, a number, hexadecimal, or verbal description.

In an embodiment, the context object 112 stores a state transition history 118. The state transition history 118 may include an ordered sequence of states. The state transition history 118 may include a set of previous states in a current dialogue. The state transition history 118 may include a series of states in a prior dialogue. The state transition history 118 may correlate state transitions with user input and/or information retrieved by the query system 110.

In an embodiment, the query system definition interface 102 is a user interface (UI) for configuring a state diagram. The state diagram can be used to generate code corresponding to an application for executing a particular task via query system 110. The query system definition interface 102 renders user interface elements and receives input via user interface elements. Examples of visual interfaces include a graphical user interface (GUI) and a command line interface (CLI). Examples of user interface elements include checkboxes, radio buttons, dropdown lists, list boxes, buttons, toggles, text fields, date and time selectors, command lines, sliders, pages, and forms.

In an embodiment, different components of the query system definition interface 102 are specified in different languages. The behavior of user interface elements is specified in a dynamic programming language, such as JavaScript. The content of user interface elements is specified in a markup language, such as hypertext markup language (HTML) or extensible markup language (XML) User Interface Language (XUL). The layout of user interface elements is specified in a style sheet language, such as Cascading Style Sheets (CSS). Alternatively, query system definition interface 102 is specified in one or more other languages, such as Java, C, or C++.

In an embodiment, the query system definition interface 102 displays movable components such as text boxes and connecting arrows. The query system permits a user to rearrange the components. The components are associated with state information. By rearranging the state-defining components, the user can modify the operations to be executed by the query system 110 in association with a particular virtual assistant application.

In an embodiment, a state definition 104 describes a particular state. A state definition 104 may include information to be requested in association with a state. As an example, the state definition 104 includes the audio message, "What is your address?". The audio message is to be played while the context object is in state 5.

A state definition 104 may include an expected user input associated with the state. As an example, in a particular state, the query system 110 is configured to receive an address. The state definition 104 may associate the user input with a particular variable. For example, in a particular state, the query system is configured to receive a value for the variable address. The state definition 104 may define slots corresponding to information to be received in a particular state. As an example, the state machine generator defines a slot, {name}, for passing a name received via user input.

In an embodiment, the state relationships 106 define relationships between two or more states. Visually, the state relationships 106 may be presented, via the UI, as lines or arrows connecting state nodes. The state relationships 106 may define an order of states in a dialogue. The state relationships 106 may define a flow of states in a dialogue. As an example, in a particular state, the query system is configured to receive a "yes" or "no" response. Based on whether the response is "yes" or "no," the query system either presents directions, or presents a goodbye message.

In an embodiment, the state machine generator 108 includes hardware and/or software configured to generate executable code, based on the state diagram. As an example, the state machine generator 108 may generate a Node.js implementation of a program that will be used by the query system 110 to execute a series of operations as defined by the state diagram. The state machine generator 108 may transform the state diagram and associated metadata to executable code. The state machine generator 108 may generate code using pre-generated code blocks stored in association with nodes and connectors. The state machine generator may generate code to include custom code defined by a user via the query system definition interface.

3. CONTEXT-BASED VIRTUAL ASSISTANT DIALOGUE

Figure 2A:
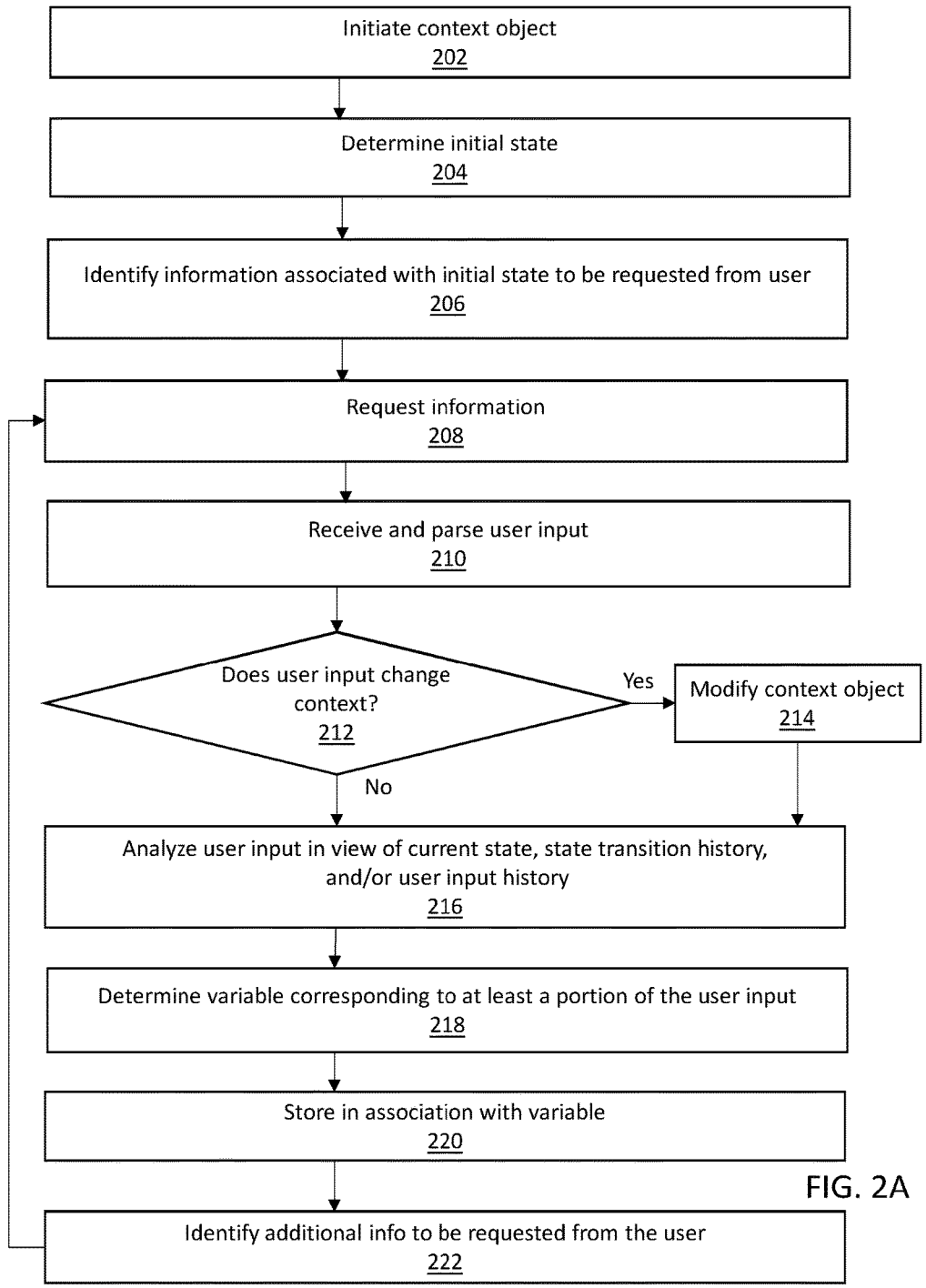
FIG. 2A illustrates an example set of operations for maintaining a context-based virtual assistant dialogue in accordance with one or more embodiments.

FIG. 2A illustrates an example set of operations for executing a context-based virtual assistant dialogue in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

In an embodiment, the query system initiates a context object (Operation 202). The query system may create a context object corresponding to a particular dialogue. The query system may allocate memory for the context object. The query system may establish fields for information to be stored to the context object.

In an embodiment, the query system determines an initial state (Operation 204). The query system may define a user-input-agnostic initial state. As an example, a user-input agnostic initial state is based on a substantially blank context object. In the user-input agnostic initial state, the query system may wait for user input. Alternatively, the query system may determine the initial state based on user input. As an example, the query system receives the voice input "Make a list." The query system identifies an initial state of a list-making application.

In an embodiment, the query system identifies information, associated with the initial state, to be requested from the user (Operation 206). The query system may use the context object to identify information associated with the initial state. As an example, the context object specifies that the current state is A987. The context object further specifies that, in state A987, the user's name is to be requested from the user.

In an embodiment, the system requests information from the user (Operation 208). The query system may transmit instructions to the user communication device to present a query requesting the identified information. The user communication device may play audio requesting the information. As an example, the user communication device plays the audio message, "What would you like for lunch?" via a smart speaker. Alternatively, or additionally, the query system may transmit instructions to the user communication device to display a text query via the visual interface. As an example, the user communication device displays the text, "What would you like for lunch?" via a messaging interface.

In an embodiment, the query system receives and parses user input (Operation 210). The user communication device may receive, from the user, an audio stream comprising voice input. The user communication device may transmit the audio stream to the query system. The query system may convert the audio stream to text. Alternatively, or additionally, the user communication device may receive, from the user, text input. The user communication device may transmit the text input to the query system.

By parsing the user input, the query system may identify different portions of the user input. The query system may execute natural language analysis to interpret the user input. The query system may isolate relevant words or phrases in the user input, based on the current state. The query system may compare received text to template language associated with a task executable by the query system.

In an embodiment, the query system determines whether the user input changes the context (Operation 212). The query system may determine that the user input changes the context if the user input includes the requested information. As an example, state 7 is associated with receiving an address. Upon receiving the address, the context object is updated to the next state, state 8. The query system may determine that the user input changes the context if the user input includes a new request. As an example, the system receives the user input "Wait, I want to send an email, not a text message." Accordingly, the context has changed. The state should be modified to reflect the new context.

In an embodiment, the query system modifies the context object (Operation 214). The query system may modify the context object based on the user input, by storing information and/or updating the current state.

In an embodiment, the query system updates the current state of the context object. The query system may modify the context object from a first state to a second state, based on the voice input being received while the context object is in the first state. The query system may increment the state identification number. As an example, the query system receives user input associated with state 1. Accordingly, the query system increments the state identification number to state 2. Upon incrementing the state identification number, the context object may determine operations associated with the new current state. The query system may identify a block of code to execute, based on the current state.

Modifying the context object may further comprise storing information to the context object. The query system may store user input to the context object in association with a variable, as described below.

In an embodiment, the query system analyzes user input in view of the current state, state transition history, and/or user input history (Operation 216). The query system may determine a context for the user input, based on the analysis.

In an embodiment, the query system determines an expected response in view of the current state. The query system may retrieve a stored expected response type, based on the current state. As an example, the current state is R77. In state R77, the query system is configured to receive a bank account number. Accordingly, the query system selects an eleven-digit number from the user input.

In an embodiment, the query system analyzes user input in view of state transition history. The query system may determine a context for the user input, based on one or more previous states in the current dialogue. As an example, when the context object was in state 1, the query system obtained the name of a traveler, Joe Smith, to add to a reservation. In state 2, the query system obtains the passport number of a traveler. Because the immediately preceding state identified traveler Joe Smith, the query system determines that the passport number is Joe Smith's. Alternatively, or additionally, the query system may determine a context for the user input based on one or more previous states in a prior dialogue.

In an embodiment, the query system analyzes user input in view of user input history. The query system may determine a context for user input based on user input history in the current dialogue. Alternatively, or additionally, the query system may determine a context for user input based on user input history in a prior dialogue. As an example, in a prior dialogue, the user requested directions to Health Mart. When prompted for a location, the user selected a J Street location. Accordingly, the query system interprets a current request for directions to Health Mart as a request for directions to the J Street Health Mart location.

In an embodiment, the query system determines a variable corresponding to at least a portion of the user input (Operation 218). The query system may identify a variable based on the context object. As an example, the context object includes a slot for receiving the variable account number. The query system determines that a received number is an account number, corresponding to the account number slot. Alternatively, or additionally, the query system may identify values based on context in the user input. As an example, the user says, "My account number is 12345678." Based on the combination of a number and the words "account number," the query system identifies 12345678 as a value corresponding to the account number slot.

In an embodiment, the query system stores the corresponding portion of the user input in association with the variable (Operation 220). The query system may store user input, corresponding to a variable, to the context object. Alternatively, or additionally, the query system may store user input, corresponding to a variable, to a data repository. The query system may store a selected portion of the user input to a slot corresponding to the variable.

In an embodiment, the query system maps at least a portion of the user input to a corresponding variable. The query system may map user input to a variable based on the current state. The query system may map user input to a variable based on a prior state. Based on the mapping, the query system may store the input in association with the variable. Alternatively, or additionally, the query system may execute a query based on the mapping. As an example, the query system receives the user input, "Tell me the balance for my checking account." The system maps the request to a routine, lookupBalance. The routine includes an account number slot. The system maps "main checking account" to the account number slot.

In an embodiment, the query system may discard a portion of the voice input without mapping the portion to any variable. As an example, the query system receives the voice input, "I am the passenger." The query system maps a portion of the input, "passenger" to a corresponding variable, user role. The query system discards the remaining portion of the voice input, "I am the."

In an embodiment, the query system identifies additional information to be requested from the user (Operation 222). The query system may identify additional information to be requested from the user based on information stored to the context object, such as the current state and/or user input history. The query system may compare received input to an expected response type. Based on the expected response type, the query system may determine whether the required information has been received.

In an embodiment, the additional information to be requested from the user is identified based on a state transition. The context object may be updated to a new state, associated with a new variable to be accepted by the system. As an example, in state 5, the system receives a first name and a last name. Upon receiving the first name and last name, the context object is updated to state 6. In state 6, the system is configured to request an address.

In an embodiment, the additional information to be requested from the user is selected based on one or more user inputs received. Additional information to be requested from the user may be selected based on an order of receipt of two or more user inputs.

In an embodiment, the additional information to be requested from the user is selected based on time between the receipt of two or more user inputs. As an example, the query system receives two voice inputs. The first voice input is, "What is on the calendar for today?". The user is currently in San Francisco. The user has an appointment in San Jose. The query system determines and presents the response, "You're going to San Jose." The system receives a second voice input, "What's the weather like?". If the second voice input is received on the same day as the first voice input, then the system presents the request, "Would you like the weather in San Jose or San Francisco?". On the other hand, if the second voice input is received a day after the first voice input, then the query system presents the weather in San Francisco, without requesting additional information.

In an embodiment, the additional information to be requested from the user is selected based on a lack of any intervening user input, which changes the context object, between the first voice input and the second voice input. In a particular state, the context object may be configured to accept two or more variables. If the required variables are not received, then the context object is not updated to the next state. The query system may request additional information, corresponding to one or more variables associated with the current state. As an example, in state 5, the system is configured to receive a first name and last name. A user response, received while in state 5, includes a first name but not a last name. Accordingly, the query system determines that a last name is to be requested from the user.

In an embodiment, if additional information is to be requested from the user, then the system requests the additional information (Operation 208, described above).

If additional information is not to be requested from the user, then the system may terminate the dialogue. The system may generate an exit statement, prior to ending the dialogue. As an example, the user communication device plays audio reciting the message, "Order confirmed. Goodbye."

The following detailed example illustrates operations in accordance with one or more embodiments. The following detailed example should not be construed as limiting the scope of any of the claims. The query system receives the voice input, from a user, "Book a flight to Paris." The voice input, "book a flight," invokes the virtual assistant application BookTravel. The BookTravel application comprises a set of states, each state having a unique state identifier. The context object is set to state 0001, corresponding to a first state of the BookTravel application.

When the context object is in state 0001, the system requests a departure date. To request the departure date, the system plays the audio, "When would you like to leave?", via a smart speaker. When the context object is in state 0001, the system is configured receive and store user input corresponding to a departure date. The context object specifies that the departure date should be stored to a slot, DepartureDate, in the form MM/DD/YYY. The system receives the user input, "I want to leave on December 5." The system converts the voice input to text. The system executes natural language analysis to identify a date in the text. The system appends the current year to the received input, to generate the variable 12/05/2017. The system stores the value 12/05/2017 to the DepartureDate slot. The context object is updated from state 0001 to state 0002.

When the context object is in state 0002, the system is configured to request a return date. To request the return date, the system plays the audio, "When would you like to return?", via a smart speaker. When the context object is in state 0002, the system is configured receive and store user input corresponding to a return date. The input should be stored to a slot, ReturnDate, in the form MM/DD/YYYY. The system receives the user input, "I want to stay for ten days." The system converts the voice input to text. The system executes natural language analysis to determine that the user is providing a length of stay. The system converts the length of stay to a return date, generating the variable 12/15/2017. The system stores the value 12/15/2017 to the ReturnDate slot. The context object is updated from state 0002 to state 0003.

When the context object is in state 0003, the system is configured to request a destination, unless the destination has already been received from the user. The system analyzes user input history stored to the context object. The system determines that a destination has already been specified in the user's initial request. The system stores the destination, Paris, to a Destination slot. The context object is updated to state 0004.

When the context object is in state 004, the system is configured to identify flight information to present the flight information to the user. The system executes a query to a third-party travel booking application. The system passes the variables in the Destination, DepartureDate, and ReturnDate slots to the travel booking application. The system selects a flight, of a set of flights presented by the travel booking application. The system generates and plays the audio message: "OK. I found a roundtrip flight to Paris leaving December 5 and returning December 15, on France Airlines. It is $800 for economy class. Shall I book it?".

When the context object is in state 0004, the system is configured to receive a "yes" or "no" response. The system receives the voice input, "Yes." The system analyzes the user input, in light of the current state. Based on the current state, the system determines that the "yes" corresponds to an instruction to book the selected flight. The context object is updated to state 0005.

When the context object is in state 0005, the system is configured to book the selected flight. The system transmits a request to the travel booking application to purchase a roundtrip ticket for the selected flight. When the context object is in state 0005, the system is further configured to play a final message. The system plays the message, via a smart speaker, "OK. Your flight is booked. Goodbye." The system terminates the dialogue.

4. CUSTOMIZING A VIRTUAL ASSISTANT APPLICATION

Figure 2B:
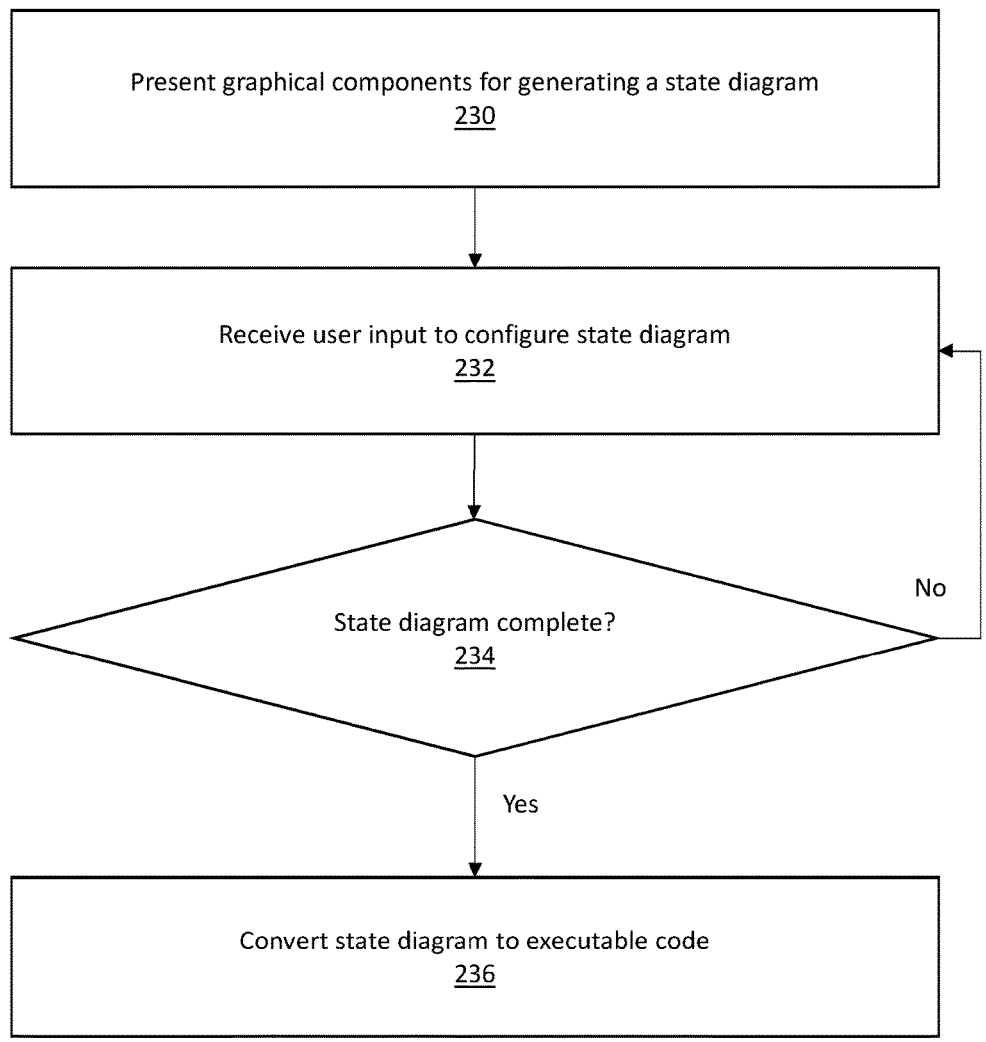
FIG. 2B illustrates an example set of operations for customizing a virtual assistant application in accordance with one or more embodiments.

FIG. 2B illustrates an example set of operations for customizing a virtual assistant application in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

Figure 3:
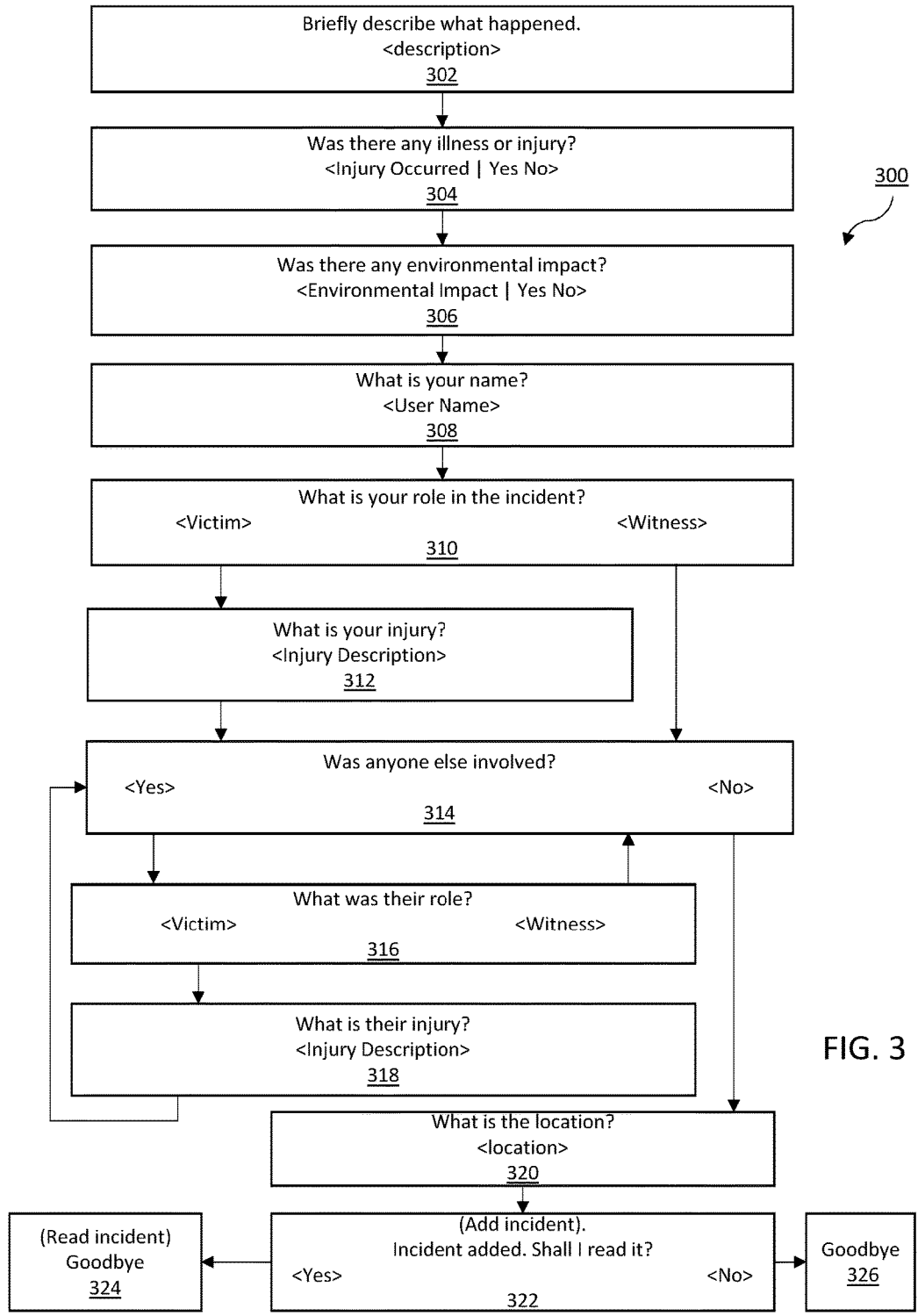
FIG. 3 illustrates an example state diagram in accordance with one or more embodiments.

In an embodiment, the query system definition interface presents graphical components for generating a state diagram (Operation 230). The query system definition interface may present nodes corresponding to respective states. A node may be prefilled with text. Alternatively, or additionally, a node may be a blank text box for receiving custom user input. The query system definition interface may present connectors, such as arrows, for linking up states into a flow chart. FIG. 3 illustrates an example state diagram.

In an embodiment, a particular state is defined with a message for the query system to present to a user. For example, a node, corresponding to state 1, contains the text "What would you like to do today?". When the context object is in state 1, the user communication device plays the audio, "What would you like to do today?".

Alternatively, or additionally, a state may be defined with variables corresponding to an expected user response. A state may be represented by a particular type of expected input. A state may be associated with an open-ended question. In a state associated with an open-ended question, the system may accept any response (i.e., one word or one hundred words). A state may be associated with a specific set of valid responses. As an example, a node contains the text: <Injury Occurred|Yes No>. The node corresponds to a state in which a user response of "yes" or "no" is expected.

Alternatively, or additionally, a state may be defined with an operation to be executed. When the context object is in a particular state, the query system may be configured to execute a particular operation. A state may be associated with a task, such as making a list, or transmitting a request to a third-party application. As an example, when the context object is in state 5, the query system obtains a weather report by querying a weather application.

In an embodiment, the query system definition interface receives user input to configure the state diagram (Operation 232). The query system definition interface may prompt a user to drag and drop the text boxes and connectors to create a flowchart-style state diagram. The query system definition interface may allow a user to add or remove nodes from the state diagram. The query system definition interface may allow a user to rearrange the order in which nodes appear in the state diagram. The query system definition interface may allow a user to insert or arrange arrows to define a flow in the state diagram.

The query system definition interface may allow a user to assign a type to a node. As an example, a node corresponds to a state in which the system is configured to receive an open-ended response. The query system may allow a user to specify names and types for the variables associated with a node. As an example, a user enters the text <User Role: Customer|Seller>. The node is associated with the variable User Role. The node is of a type configured to accept one of two responses.

The query system definition interface may receive user input in the form of custom execution code. As an example, a user configures a node for receiving an incident report. The query system definition interface allows the user to enter custom implementation logic to generate a Representational State Transfer (REST) services call to add the incident in a third-party system.

The query system definition interface may receive user input in the form of metadata. The query system definition interface may allow a user to enter metadata specifying information such as a table in which to find a particular piece of data, or a web application to be used in executing a query.

In an embodiment, the query system definition interface determines whether the state diagram is complete (Operation 234). The query system definition interface may display a button with a label such as "Complete State Diagram," "Export," or "Make my Application." Responsive to the user clicking the button, the query system definition interface determines that the state diagram is complete. If the user does not click the button, the query system definition interface may determine that the state diagram is not complete.

In an embodiment, if the state diagram is not complete, the query system definition interface continues to receive user input to configure the state diagram (Operation 232, described above).

In an embodiment, if the state diagram is complete, then the state machine generator converts the state diagram to executable code (Operation 236). The state machine generator executes a transformation process on the flowchart and associated metadata. The state machine generator generates an implementation block corresponding to each state of the state diagram. A particular state may correspond to an implementation block such as a case in a switch statement or a function. The implementation block may include code to save, to the context object, input received corresponding to a variable. The implementation block may include code to generate a response object, including text to be read. The implementation block may include any custom code specified in the state diagram. The implementation block may include code to analyze the context object and execute the appropriate execution block when a packet is received.

In an embodiment, the state machine generator assigns a unique identification (ID) number to each state in the state diagram. The state machine generator may assign numbers and/or letters to identify a particular state. Sequential states may be given sequential ID numbers.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 3 illustrates an example state diagram 300 in accordance with one or more embodiments. The state diagram 300 may be generated using the query system definition interface, as described with respect to FIG. 2B. As shown in FIG. 3, the state diagram comprises a set of nodes (302-326), each node representing a respective state. The text in each node represents outputs and/or inputs associated with the corresponding state. The nodes are connected with arrows to make a flowchart. Each arrow represents a transition from a first state to a second state.

Node 302 represents the initial state for a dialogue to generate an incident report. When the context object is in state 302, the user communication device presents the message, "Briefly describe what happened." Node 302 further specifies a slot to receive user input. When the context object is in state 302, user input corresponding to a description is stored to the slot description. Node 302 is of a type configured to receive open-ended user input. The user may describe what happened in as many words as desired. The system may be configured to accept multi-word user input via one or more slots. For example, each word in the description may be stored to a different slot. Storing words to respective slots may allow a free-form description to be stored, even if a particular virtual assistant platform is not configured to receive a free-form user response.

Upon receiving user input in state 302, the context object is updated to state 304. In state 304, the user communication device presents the message, "Was there any illness or injury?". In state 304, the system is further configured to receive user input. Node 304 is of a type configured to receive a "yes" or "no" answer, corresponding to whether an injury occurred. The system may be configured to accept variations of "yes" and "no", such as "yea," "yep," or "nope."

Upon receiving user input in state 304, the context object is updated to state 306. In state 306, the user communication device presents the message, "Was there any environmental impact?". State 306 includes slots to receive "yes" or "no" input. The input corresponds to whether there was any environmental impact. In both state 304, and state 306, the system may receive a "yes" or "no" input. Based on the current state, the system can determine the appropriate context each time the user says "yes" or "no." If the system is in state 304, "yes" means there was an illness or injury. If the system is in state 306, "yes" means there was an environmental impact.

Upon receiving user input in state 306, the context object is updated to state 308. In state 308, the user communication device presents the message, "What is your name?". In state 308, the system is configured to receive user input, associated with a slot, <User Name>, for storing a name. When the system receives user input while in state 308, the query system identifies a name. The query system stores the description to the <User Name> slot.

Upon receiving the user input in state 308, the context object is updated to state 310. In state 310, the user communication device presents the message, "What is your role in the incident?". The system is further configured to receive user input in state 310. If the user responds "witness," while the context object is in state 310, then the context object is updated to state 314. If the user is a witness, the state diagram is configured to omit questions about an injury to the user (i.e., the next state is 314, skipping state 312).

On the other hand, if the user responds "victim," while the context object is in state 310, then the context object is updated to state 312. In state 312, the user communication device presents the message, "What is your injury?". Node 312 includes a slot, <Injury Description>. When the context object is in state 312, the query system identifies and stores a description to the <Injury Description> slot.

Upon receiving user input in state 312, the context object is updated to state 314. In state 314, the user communication device presents the message, "Was anyone else involved?". Node 312 is configured to receive a "yes" or "no" input.

If the received input is "Yes," then the context object is updated to state 316. If the received input is "No," then the context object is updated to state 320. The state diagram has been configured to include questions about additional victims, if the answer is yes (i.e., the context object is updated to state 316). The state diagram has been configured to omit questions about additional victims, if the answer is no (i.e., the context object is updated to state 320, skipping states 316-318).

In state 316, the user communication device presents the message, "What was their role?". Node 316 is configured to receive one of two responses: "victim," or "witness".

If the system receives the input, "witness," while the context object in state 316, then the context object is updated to state 314. If the answer is witness, the state diagram is configured to omit questions about an injury.

On the other hand, if the user responds "victim," while the system is in state 316, then the context object is updated to state 318. If the person is a victim, then the query system requests an injury description. In state 318, the user communication device presents the message "What was their injury?". The system is configured to store an open-ended injury explanation to the slot Injury Description.

Subsequent to receiving an injury description, the context object is updated to state 314 (described above), to determine whether anyone else was involved.

If no one else was involved, then the context object is updated to state 320. In state 320, the user communication device presents the message, "What is the location?". The system stores user input, corresponding to a location, to the location slot.

Subsequent to receiving a location in state 320, the context object is updated to state 322. The incident report is complete. The query system stores the incident to a data repository. The user communication device presents the message, "Add incident. Shall I read it?". Node 322 is configured to receive a "yes" or "no" response.

If the user input includes a variation of "Yes," then the context object is updated to state 324. The state diagram has been configured to read the incident report, if the user input is "yes." When the context object is in state 324, the user communication device presents a message including a read-out of the incident report and the message, "Goodbye." Subsequent to presenting the message, the query system closes the application.

If user input includes a variation of "No," then the context object is updated to state 326. The state diagram has been configured to refrain from reading the incident report, if the answer is no. When the context object is in state 356, the user communication device presents the message, "Goodbye," and closes the application.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    receiving a user-defined state diagram comprising (a) a first node corresponding to a first state and a first state definition, (b) a second node corresponding to a second state and a second state definition, and (c) a relationship between the first state and the second state,
    wherein the second state definition indicates information that is to be requested in association with the second state;
    converting, by a state machine generator, the user-defined state diagram to executable code for a virtual assistant application,
    wherein converting the user-defined diagram to executable code comprises using (a) a first pre-generated code block stored in association with the first node and (b) a second pre-generated code block stored in association with the second node;
    implementing a query system based on the executable code;
    receiving, by the query system via a smart speaker, a first voice input from a user;
    responsive to receiving the first voice input and based on the relationship between the first state and the second state: modifying, by the query system, a context object from a first state to a second state;
    based on the second state definition: selecting, by the query system, the information associated with the second state to be requested from the user;
    requesting, by the query system via the smart speaker, the information associated with the second state;
    receiving, by the query system via the smart speaker, a second voice input from the user;
    mapping, based at least on the first voice input, at least a portion of the second voice input to a first variable corresponding to the information; and
    storing at least the portion of the second voice input as a value for the first variable.

2. The medium of claim 1, wherein the operations further comprise: prior to receiving the first voice input, configuring an initial state of the context object that is user-input agnostic.

3. The medium of claim 1, wherein mapping based at least on the first voice input comprises mapping based on the second state that was determined based on the first voice input.

4. The medium of claim 1, wherein the user interface further comprises one or more options to allow the addition, removal, or position of graphical components.

5. The medium of claim 1, wherein the user-defined state diagram is designed via a user interface comprising graphical components representing, at least, the first state and the second state in the user-defined state diagram.

6. The medium of claim 5, wherein the user interface further comprises graphical components representing, at least, the relationship between the first state and the second state.

7. The medium of claim 1, wherein the operations further comprise:
    based on the second voice input: modifying, by the query system, the context object from the second state to a third state;
    selecting additional information, associated with the third state, to be requested from the user;
    requesting, by the query system via the smart speaker, the additional information associated with the third state;
    receiving, by the query system via the smart speaker, a third voice input from the user;
    mapping, based at least on the second voice input, at least a portion of the third voice input to a second variable corresponding to the additional information; and
    storing at least the portion of the third voice input as a value for the second variable.

8. The medium of claim 7, wherein the third state is based on the query system transitioning to the second state from the first state.

9. The medium of claim 1, wherein modifying the context object from the first state to the second state is based on the first voice input being received while the context object is in the first state.

10. The medium of claim 1, wherein the second state is the same as the first state.

11. The medium of claim 1, wherein the operations further comprise generating an implementation block corresponding to each state of the state diagram.

12. The medium of claim 11, wherein the implementation block is a switch statement.

13. The medium of claim 11, wherein the implementation block includes code to save, to the context object, input received corresponding to a variable.

14. The medium of claim 11, wherein the implementation block includes code to generate a response object including text to be output.

15. The medium of claim 11, wherein the implementation block includes custom code specified in the state diagram.

16. The medium of claim 11, wherein the implementation block includes code to analyze the context object and execute the appropriate execution block when a packet is received.

17. The medium of claim 1, wherein the operations further comprise discarding a second portion of the second voice input without mapping the second portion to any variable.

18. A method comprising:
receiving a user-defined state diagram comprising (a) a first node corresponding to a first state and a first state definition, (b) a second node corresponding to a second state and a second state definition, and (c) a relationship between the first state and the second state,
wherein the second state definition indicates information that is to be requested in association with the second state;
converting, by a state machine generator, the user-defined state diagram to executable code for a virtual assistant application,
wherein converting the user-defined diagram to executable code comprises using (a) a first pre-generated code block stored in association with the first node and (b) a second pre-generated code block stored in association with the second node;
implementing a query system based on the executable code;
receiving, by the query system via a smart speaker, a first voice input from a user;
responsive to receiving the first voice input and based on the relationship between the first state and the second state: modifying, by the query system, a context object from a first state to a second state;
based on the second state definition: selecting, by the query system, the information associated with the second state to be requested from the user;
requesting, by the query system via the smart speaker, the information associated with the second state;
receiving, by the query system via the smart speaker, a second voice input from the user;
mapping, based at least on the first voice input, at least a portion of the second voice input to a first variable corresponding to the information; and
storing at least the portion of the second voice input as a value for the first variable.

19. A system comprising:
at least one device including a hardware processor;
the system configured to perform operations comprising:
receiving a user-defined state diagram comprising (a) a first node corresponding to a first state and a first state definition, (b) a second node corresponding to a second state and a second state definition, and (c) a relationship between the first state and the second state,
wherein the second state definition indicates information that is to be requested in association with the second state;
converting, by a state machine generator, the user-defined state diagram to executable code for a virtual assistant application,
wherein converting the user-defined diagram to executable code comprises using (a) a first pre-generated code block stored in association with the first node and (b) a second pre-generated code block stored in association with the second node;
implementing a query system based on the executable code;
receiving, by the query system via a smart speaker, a first voice input from a user;
responsive to receiving the first voice input and based on the relationship between the first state and the second state: modifying, by the query system, a context object from a first state to a second state;
based on the second state definition: selecting, by the query system, the information associated with the second state to be requested from the user;
requesting, by the query system via the smart speaker, the information associated with the second state;
receiving, by the query system via the smart speaker, a second voice input from the user;
mapping, based at least on the first voice input, at least a portion of the second voice input to a first variable corresponding to the information; and
storing at least the portion of the second voice input as a value for the first variable.

* * * * *